(12) United States Patent
Iyer et al.

(10) Patent No.: US 9,413,022 B2
(45) Date of Patent: Aug. 9, 2016

(54) FUEL CELL SYSTEM COUPLED TO A PORTABLE COMPUTING DEVICE

(75) Inventors: Vijay M. Iyer, Mountain View, CA (US); Bradley L. Spare, Oceanside, CA (US)

(73) Assignee: Apple Inc., Cupertino, CA (US)

( * ) Notice: Subject to any disclaimer, the term of this patent is extended or adjusted under 35 U.S.C. 154(b) by 1157 days.

(21) Appl. No.: 13/096,877

(22) Filed: Apr. 28, 2011

(65) Prior Publication Data

US 2011/0313589 A1    Dec. 22, 2011

Related U.S. Application Data

(63) Continuation-in-part of application No. 12/849,558, filed on Aug. 3, 2010.

(60) Provisional application No. 61/355,393, filed on Jun. 16, 2010.

(51) Int. Cl.
*H01M 8/04* (2016.01)

(52) U.S. Cl.
CPC ...... *H01M 8/04917* (2013.01); *H01M 8/04201* (2013.01); *H01M 8/04298* (2013.01); *H01M 8/0432* (2013.01); *H01M 8/0438* (2013.01); *H01M 8/0491* (2013.01); *H01M 8/0494* (2013.01); *H01M 8/04552* (2013.01); *H01M 8/04656* (2013.01); *H01M 8/04753* (2013.01); *H01M 8/04768* (2013.01); *H01M 2250/30* (2013.01); *Y02B 90/18* (2013.01); *Y02E 60/50* (2013.01)

(58) Field of Classification Search
None
See application file for complete search history.

(56) References Cited

U.S. PATENT DOCUMENTS

| 2004/0207267 A1* | 10/2004 | Ozeki et al. ............. 307/150 |
| 2006/0068241 A1* | 3/2006 | Tanaka ............. 429/12 |
| 2010/0104896 A1* | 4/2010 | Johnson ............. H01M 8/04492 429/410 |

* cited by examiner

*Primary Examiner* — Ula C Ruddock
*Assistant Examiner* — Tony Chuo
(74) *Attorney, Agent, or Firm* — Blank Rome LLP

(57) ABSTRACT

The disclosed embodiments relate to the design of a fuel cell system which is capable of both providing power to and receiving power from a rechargeable battery in a portable computing device. This eliminates the need for a bulky and heavy battery within the fuel cell system, which can significantly reduce the size, weight and cost of the fuel cell system. This fuel cell system includes a fuel cell stack which converts fuel into electrical power. It also includes a controller which controls operation of the fuel cell system. The fuel cell system additionally includes a power link that transfers electrical power between the fuel cell system and the portable computing device, and a communication link that provides communication between the portable computing device and the controller for the fuel cell system. The controller can regulate both the electrical power provided by the fuel cell system to the portable computing device and the electrical power provided by the rechargeable battery to the fuel cell system.

20 Claims, 8 Drawing Sheets

FUEL CELL SYSTEM COUPLED TO A PORTABLE COMPUTING DEVICE

RELATED APPLICATION

This application is a continuation-in-part of U.S. application Ser. No. 12/849,558, entitled "Fuel Cell System to Power a Portable Computing Device," by inventors Bradley L. Spare, Vijay M. Iyer, Jean L. Lee, Gregory L. Tice, Michael D. Hillman and David I. Simon, filed Aug. 3, 2010, and also claims the benefit of U.S. Provisional Application No. 61/355,393, entitled "Portable Hydrogen Fuel Cell System," by inventors Bradley L. Spare, Vijay M. Iyer, Jean L. Lee, Gregory L. Tice, Michael D. Hillman and David I. Simon, filed Jun. 16, 2010.

BACKGROUND

1. Field

The disclosed embodiments generally relate to systems that use fuel cells to provide electrical power. More specifically, the disclosed embodiments relate to a fuel cell system which is designed to both provide electrical power to and receive electrical power from a portable computing device.

2. Related Art

Our country's continuing reliance on fossil fuels has forced our government to maintain complicated political and military relationships with unstable governments in the Middle East, and has also exposed our coastlines and our citizens to the associated hazards of offshore drilling. These problems have led to an increasing awareness and desire on the part of consumers to promote and use renewable energy sources. For example, the Electronic Product Environmental Assessment Tool (EPEAT) is presently used to produce data that helps consumers evaluate the environmental friendliness of electronic products. Moreover, the EPEAT score for an electronic product can be increased by providing a renewable energy source for the product.

As a consequence of this increased consumer awareness, electronics manufacturers have become very interested in developing renewable energy sources for their products, and they have been exploring a number of promising renewable energy sources such as the hydrogen fuel which is used in hydrogen fuel cells. Hydrogen fuel cells have a number of advantages. Such fuel cells and associated fuels can potentially achieve high volumetric and gravimetric energy densities, which can potentially enable continued operation of portable electronic devices for days or even weeks without refueling. However, it is extremely challenging to design hydrogen fuel cell systems which are sufficiently portable and cost-effective to be used with portable electronic devices.

SUMMARY

The disclosed embodiments relate to the design of a fuel cell system which is capable of both providing power to and receiving power from a rechargeable battery in a portable computing device. This eliminates the need for a bulky and heavy battery within the fuel cell system, which can significantly reduce the size, weight and cost of the fuel cell system. This fuel cell system includes a fuel cell stack which converts fuel into electrical power. It also includes a controller which controls operation of the fuel cell system. The fuel cell system additionally includes a power link that transfers electrical power between the fuel cell system and the portable computing device, and a communication link that provides communication between the portable computing device and the controller for the fuel cell system. The controller can regulate both the electrical power provided by the fuel cell system to the portable computing device and the electrical power provided by the rechargeable battery to the fuel cell system.

In some embodiments, while regulating the electrical power provided by the rechargeable battery to the fuel cell system, the controller can monitor an operational parameter of the fuel cell stack during a boot-up process of the fuel cell system, and subsequently regulate a discharging current provided by the rechargeable battery to the fuel cell stack based on the value of the operational parameter.

In some embodiments, while regulating the discharging current based on the value of the operational parameter, the controller determines if the value of the operational parameter is less than a set-point value. If so, the controller maintains the discharging current provided by the rechargeable battery to the fuel cell stack. Otherwise, the controller terminates the discharging current provided by the rechargeable battery to the fuel cell stack.

In some embodiments, the operational parameter is a hydrogen pressure within the fuel cell stack.

In some embodiments, the fuel cell system does not have an internal rechargeable battery.

In some embodiments, while regulating the electrical power provided by the fuel cell system to the portable computing device, the controller can monitor an operational parameter of the fuel cell stack and regulate a charging current provided by the fuel cell stack to the portable computing device based on the value of the operational parameter.

In some embodiments, while regulating the charging current based on the value of the operational parameter, the controller can communicate with a charging circuit in the portable computing device, wherein the charging circuit is configured to charge the rechargeable battery based on the charging current.

In some embodiments, while regulating the charging current based on the value of the operational parameter, the controller first determines whether the value of the operational parameter is greater than or smaller than a set-point value. If the value of the operational parameter is greater than the set-point value, the controller regulates the charging current so that the value of the operational parameter decreases. If the value of the operational parameter is smaller than the set-point value, the controller regulates the charging current so that the value of the operational parameter increases.

In some embodiments, if the value of the operational parameter is greater than the set-point value, the controller can continue regulating the charging current until the value of the operational parameter decreases to the set-point value. On the other hand, if the value of the operational parameter is smaller than the set-point value, the controller can continue regulating the charging current until the value of the operational parameter increases to the set-point value.

In some embodiments, if the value of the operational parameter is substantially equal to the set-point value, the controller can maintain the charging current so that the value of the operational parameter remains the same.

In some embodiments, while regulating the charging current to decrease the value of the operational parameter, the controller can transmit a first control signal to the charging circuit in the portable computing device. This first control signal causes the charging circuit to increase the charging speed for the rechargeable battery, which subsequently causes the charging current to increase and the value of the operational parameter to decrease.

In some embodiments, while regulating the charging current to increase the value of the operational parameter, the controller can transmit a second control signal to the charging circuit in the portable computing device. The second control signal causes the charging circuit to decrease the charging speed for the rechargeable battery, which subsequently causes the charging current to decrease and the value of the operational parameter to increase.

In some embodiments, the controller transmits the first and the second control signals through the communication link.

In some embodiments, the controller routes the charging current through the power link.

In some embodiments, the charging circuit converts the charging current into a charging voltage suitable for charging the rechargeable battery.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Fuel Cell System

Figure 1A:
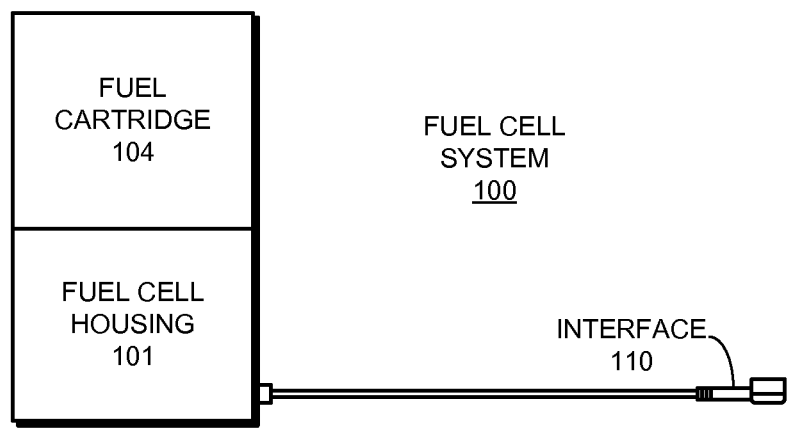
FIG. 1A illustrates a fuel cell system in accordance with the disclosed embodiments.

FIG. 1A provides an external view of a portable fuel cell system 100 in accordance with the disclosed embodiments. This portable fuel cell system 100 includes a fuel cell housing 101, which contains a power module with a fuel cell stack that is described in more detail below with reference to FIG. 1B. Fuel cell housing 101 is configured to receive a detachable fuel cartridge 104, which contains a suitable fuel, such as sodium borohydride ($NaBH_4$). Moreover, fuel cell housing 101 can provide power to a portable electronic device through a special interface 110.

Figure 1B:
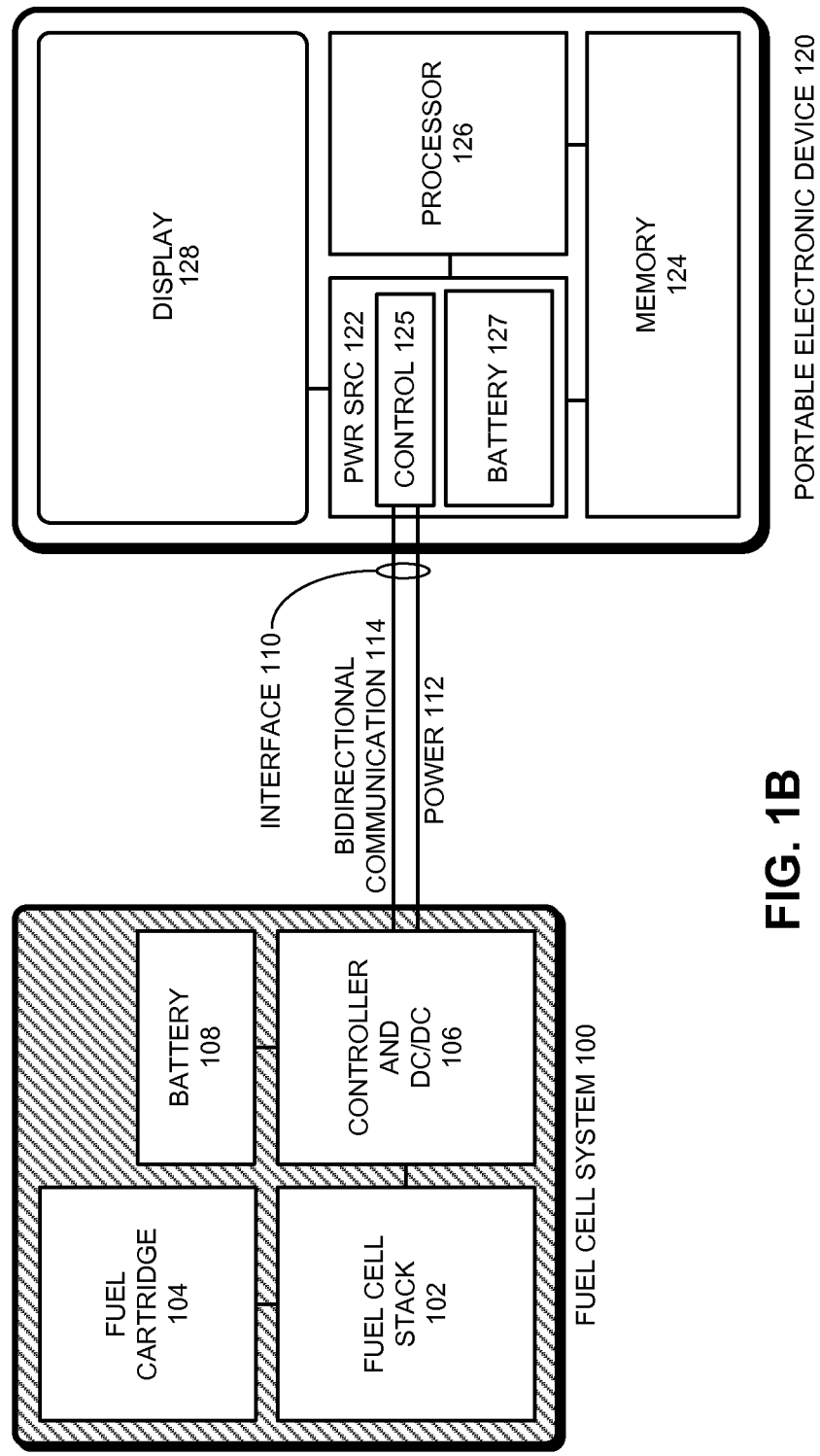
FIG. 1B illustrates how a fuel cell system can be connected to a portable computing device in accordance with the disclosed embodiments.

FIG. 1B illustrates some of the internal structures of fuel cell system 100 in accordance with the disclosed embodiments. More specifically, fuel cell system 100 includes a fuel cell stack 102 which produces electrical power by converting a source fuel, such as hydrogen or a hydrocarbon, into an electric current and a waste product. Fuel cell stack 102 comprises a stack of fuel cells, wherein each a fuel cell contains an anode, a cathode, and an electrolyte between the anode and cathode. Electricity may be generated by two chemical reactions within the fuel cell. First, a catalyst at the anode oxidizes the fuel to produce positively charged ions and negatively charged electrons. The electrolyte may allow ions from the oxidation process to pass through to the cathode while blocking passage of the electrons. The electrons may thus be used to drive a load connected to the fuel cell before recombining with the ions and a negatively charged atom (e.g., oxygen) at the cathode to form a waste product such as carbon dioxide and/or water.

The fuel cells within fuel cell stack 102 may include electrochemical cells that convert a source fuel into electric current and a waste product. For example, the fuel cells may be proton exchange membrane (PEM) fuel cells that use hydrogen as a fuel. The hydrogen may be catalytically split into protons and electrons at the anode of each PEM fuel cell. The protons may pass through an electrically insulating membrane electrode assembly (MEA) to the cathode of the PEM fuel cell, while the electrons may travel through a load to the cathode. The protons and electrons may then react with oxygen atoms at the cathode to form water molecules as a waste product. Alternatively, the fuel cells may correspond to solid oxide fuel cells, molten carbonate fuel cells, direct methanol fuel cells, alkaline fuel cells, and/or other types of fuel cells.

Because individual fuel cells may generate a voltage (e.g., 0.5-0.7 volts for PEM fuel cells) which is too low to drive some components in a portable electronic device (e.g., processors, peripheral devices, backlights, displays, Universal Serial Bus (USB) ports, etc.), the fuel cells may be electrically connected in a series configuration. For example, a set of 25 PEM fuel cells may be connected in series within fuel cell stack 102 to increase the voltage of fuel cell stack 102 to roughly 12.5-17.5 volts. This increased voltage may then be used to drive components with operating voltages which are at or below the voltage of fuel cell stack 102.

Power from fuel cell stack 102 feeds into circuitry 106 that performs control functions and performs direct-current (DC)-to-DC conversion operations before the power feeds through interface 110 to power portable electronic device 120. The power can also be directed to an internal rechargeable battery 108, which is configured to store excess power generated by fuel cell stack 102. Note that internal battery 108 can also be used to power a portable electronic device during a transient period when fuel cell stack 102 is preparing to produce power. Also note that instead of using rechargeable battery 108, other energy storage methods can be used, such as Super Capacitors or Lithium-Ion Capacitors. In all of these methods, the system simply stores the power in a convenient location to facilitate meeting the subsequent instantaneous power requirements of portable electronic device 120.

FIG. 1B also illustrates how fuel cell system 100 can be connected to a portable electronic device 120 through a special interface 110. This special interface 110 includes: (1) a power link that provides power 112 to the portable computing device, and (2) a bi-directional communication link that provides bi-directional communication 114 between the portable computing device and the controller for the fuel cell system. This bi-directional communication link enables the portable electronic device to control various aspects of the operation of portable fuel cell system 100 as will be described in more detail below.

Note that interface 110 may provide physical links for both power and communication. However, in an alternative embodiment, interface 110 may provide a single physical connection for the power link and a wireless bi-directional data link. In other embodiments, the power link may also be wireless.

Portable electronic device 120 may correspond to a laptop computer, mobile phone, personal digital assistant (PDA), portable media player, digital camera, and/or other type of compact electronic device. For example, portable electronic device 120 may include a processor 126, a memory 124 and a display 128, which are all powered by a power source 122. Power source 122 includes a controller 125 which selectively provides power from an internal rechargeable battery 127, or from an external source, such as fuel cell system 100.

In an alternative configuration, portable fuel cell system 100 can be "daisy-chained" so that it is connected to another fuel cell system which may or may not be connected in turn to another computer system or computing device. Moreover, portable fuel cell system 100 can also operate as a standalone device, wherein it operates to charge up internal battery 108.

Internal Structure of a Fuel Cell System

Figure 2A:
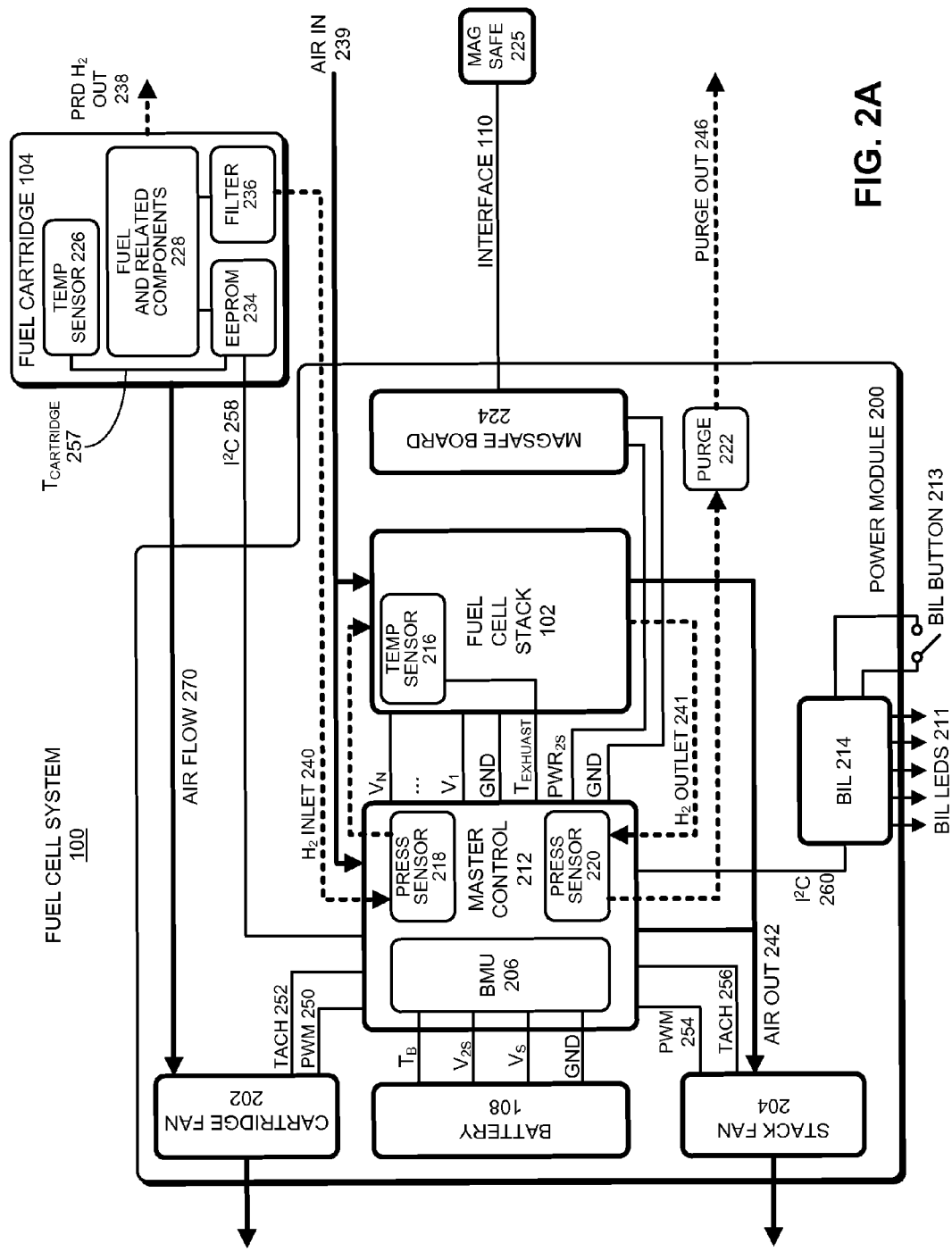
FIG. 2A illustrates details of the internal structure of a fuel cell system in accordance with the disclosed embodiments.

FIG. 2A illustrates details of some of the internal structure of a fuel cell system 100 in accordance with the disclosed embodiments. The illustrated fuel cell system 100 includes a fuel cartridge 104 that plugs into a power module 200. Power module 200 provides power to a portable computing device through a MagSafe™ connector which is coupled to the end of an interface cable 110. (Recall that interface cable 110 includes a power link as well as a bi-directional communication link.) Note that the connector on interface cable 110 is not limited to a MagSafe™ connector, and in general can include any type of connector that provides power and bi-directional communication, such as a USB connector or a 30-pin iPod™ connector. Also note that power module 200 is located within a fuel cell housing, such as fuel cell housing 101 illustrated in FIG. 1A.

Fuel cartridge 104 is comprised of a number of components, which depend on the nature of the fuel. For example, if the hydrogen is produced by a hydrolysis reaction, the fuel cartridge contains components that may include (in addition to a hydrogen-containing substance) another substance (or substances) that chemically react with the hydrogen-containing substance to release hydrogen. To support a hydrolysis reaction, the fuel cartridge can also include: (1) a feed or pump mechanism to enable the substances to combine to produce hydrogen; (2) a metering mechanism to allow for the correct ratio of substances for optimal hydrogen production; (3) a heat-dissipation mechanism (such as a fan) if the hydrogen-producing reaction is highly exothermic; (4) any filters needed to maintain the requisite purity and/or physical consistency of the reactants; and (5) a mechanism for containing any waste product that may result from the hydrogen-producing reaction. Exemplary fuels that can be used with a hydrolysis reaction can include: Sodium Borohydride, Sodium Silicate, Lithium Hydride, Magnesium Hydride, Lithium Borohydride and Lithium Aluminum Hydride.

Moreover, if hydrogen is produced by a thermolysis technique, the fuel cartridge may include (in addition to the hydrogen-containing substance) a heater that heats the hydrogen-containing substance to a sufficiently high temperature to liberate hydrogen. It may also contain a structure for thermally insulating the heater, and a structure for containing any waste product that may result. Exemplary fuels that can be used with a thermolysis technique can include: Aluminum Hydride, Amine Borane Complexes (e.g., Ammonia Borane), Hydrocarbons (e.g., Methanol), Lithium Aluminum Hydride, Magnesium Borohydride, and a Magnesium Borohydride-Amine complex.

The fuel may also take the form of pure hydrogen (e.g., compressed hydrogen gas or liquid hydrogen) in which case the fuel cartridge may contain components such as a metering device (e.g., a valve) and a pressure gauge. Ideally, the fuel has a relatively low life cycle carbon footprint, is not toxic, and generates a waste product that is amenable to being repeatedly re-charged with hydrogen and is not toxic.

More specifically, fuel cartridge 104 is comprised of a number of components, including fuel and related components 228. During operation, the fuel and related components 228 create hydrogen gas which passes through a filter 236 before feeding into an $H_2$ inlet 240 in power module 200. Operations within fuel cartridge 104 are generally controlled by an EEPROM 234, which communicates with master control board 212 in power module 200 through an $I^2C$ bus 258. A temperature sensor 226 within fuel cartridge 104 determines a temperature of the fuel cartridge 104 and communicates a temperature value $T_{CARTRIDGE}$ 257 to EEPROM 234. In addition, a cartridge fan 202 within power module 200 pulls a cooling air flow 270 through fuel cartridge 104. Fuel cartridge 104 also includes a pressure relief device (PRD), such as a valve, which vents hydrogen gas (PRD $H_2$ out 238) if too much hydrogen builds up within fuel cartridge 104.

The flow of hydrogen through fuel cell system 100 is illustrated by the dashed lines. Hydrogen gas which is generated by fuel cartridge 104 passes through a pressure sensor 218 in master control board 212 before feeding into fuel cell stack 102. Fuel cell stack 102 also includes a temperature sensor 216, which provides an exhaust temperature $T_{EXHAUST}$ to master control board 212. Excess hydrogen (along with nitrogen and water) exits fuel cell stack through $H_2$ outlet 241 and feeds through a pressure sensor 220 in master control board 212 before feeding into a passive purge valve 222. Passive purge valve 222 vents the excess hydrogen, nitrogen and water through purge output 246.

Fuel cell stack 102 generates power from the hydrogen gas. More specifically, voltage outputs $V_1, \ldots V_N$ from individual cells within fuel cell stack 102 feed into master control board 212, which directs power from these voltage outputs into either: internal battery 108 through $V_{2S}$, $V_S$ and GND connections; or into MagSafe™ board 224 though $PWR_{2S}$ and GND connections. Internal battery 108 can store the power received from fuel cell stack 102, whereas MagSafe™ board 224 can direct the power to a portable computing device through interface 110 and MagSafe™ connector 225. Master control board 212 controls internal battery 108 through a battery management unit (BMU) 206, which monitors a temperature $T_B$ from internal battery 108.

Master control board 212 also independently controls two or more fans, including cartridge fan 202 and stack fan 204. More specifically, master control board 212 controls cartridge fan 202 by providing power and a pulse-width modulated (PWM) signal 250 to cartridge fan 202. During this process, control board 212 receives a tachometer signal TACH 252 from cartridge fan 202 which indicates a speed of cartridge fan 202. As mentioned above, during operation cartridge fan 202 pulls cooling air through fuel cartridge 104. Similarly, master control board 212 controls stack fan 204 by providing power and a pulse-width modulated (PWM) signal 254 to stack fan 204. Control board 212 also receives a tachometer signal TACH 256 from stack fan 204 which indicates a speed of stack fan 204. During operation, stack fan 204 pulls cooling air across master control board 212 and through fuel cell stack 102.

Master control board 212 is also coupled to a battery indicator light (BIL) board 214 through an I²C link 260. To determine a state-of-charge of internal battery 108, a user presses an associated BIL button 213. In response to this button press, BIL board 214 communicates with BMU 206 within master control board 212 to determine a state-of-charge of internal battery 108, and then outputs a pattern on BIL LEDs 211, wherein the pattern indicates the determined state-of-charge.

DC/DC Conversion Process

Figure 2B:
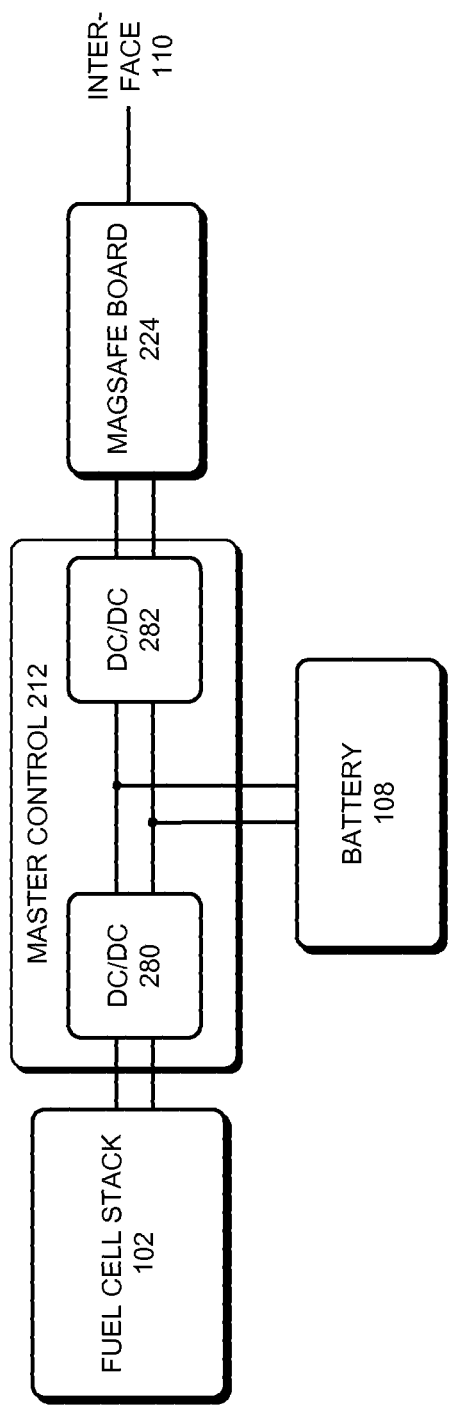
FIG. 2B illustrates a fuel cell system which uses two DC/DC converters in accordance with the disclosed embodiments.

FIG. 2B illustrates how the fuel cell system can use two DC/DC converters in accordance with the disclosed embodiments. During operation, master control board 212 receives power from fuel cell stack 102 and converts the power using a first DC/DC converter 280 into a battery voltage which is suitable for charging internal battery 108. Next, a second DC/DC converter 282 converts the battery voltage into a voltage suitable for powering a portable electronic device, and this voltage is fed into MagSafe™ board 224, which feeds the power to the portable computing device through interface 110.

System Operation

Normal operation of the system begins when the fuel cell system 100 is attached to a host, such as portable electronic device 120. If the state-of-charge of the internal battery in fuel cell system 100 is in a nominal state (between high and low state-of-charge thresholds), power delivery to the host begins. The control system then enters an initialization state and begins requesting fuel from the cartridge.

The cartridge responds by beginning its fuel generation process. During this process, hydrogen may be provided directly from a source of pure hydrogen (such as from a vessel containing compressed hydrogen gas), or it may be generated via thermolysis, hydrolysis, electrolysis, reformation, etc. As hydrogen is generated and transported to the power module, the cells in the fuel cell stack experience a voltage rise to their open circuit voltage (OCV). After the voltages cross a threshold, the controller begins to draw small amounts of current.

When this current does not excessively result in depression of the cell voltages from OCV, the system transitions into a "run" state. In the run state, hydrogen enters the fuel cell and is converted to current and heat. The oxygen for the reaction is supplied by the stack fan from ambient air, and heat is exchanged by controlling the fan to maintain the stack at a constant temperature.

Current from the stack is converted to the voltage of the internal battery and stored. The pressure control loop maintains stack outlet pressure at a set-point by controlling the DC/DC input current and charging/discharging the internal battery as necessary. The output of the internal battery charger goes through another DC/DC conversion and then powers the host computer.

In the case of a fuel cartridge where hydrogen is produced by an exothermic reaction, the controller maintains the cartridge temperature at its set-point using a cartridge fan.

Many of the above-described operations of fuel cell system 100 can be controlled through communications between fuel cell system 100 and portable electronic device 120 as is described in more detail below with reference to the flow chart in FIG. 3.

Controlling a Fuel Cell System from a Portable Electronic Device

Figure 3:
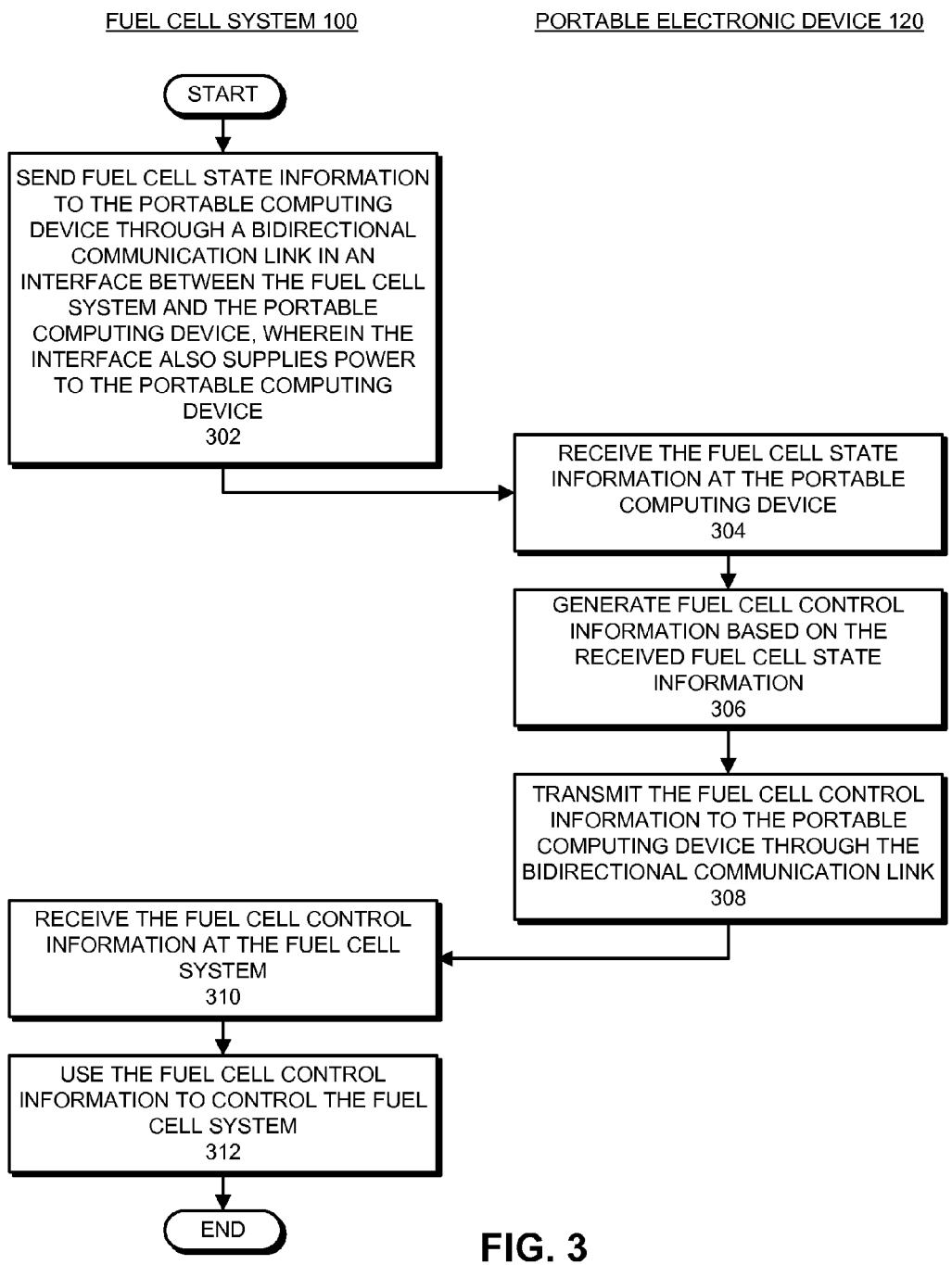
FIG. 3 presents a flow chart illustrating how a portable computing device can control a fuel cell system in accordance with the disclosed embodiments.

FIG. 3 presents a flow chart illustrating how a portable computing device can control a fuel cell system in accordance with the disclosed embodiments. The left-hand column of FIG. 3 lists actions performed by fuel cell system 100 and the right-hand column lists actions performed by portable electronic device 120. During operation, fuel cell system 100 sends fuel cell state information to portable electronic device 120, wherein the fuel cell state information is sent through an interface that comprises: a power link that provides power to the portable computing device; and a bi-directional communication link that provides bi-directional communication between the portable computing device and the fuel cell system (step 302). For example, the fuel cell state information can specify one or more of the following: how much power is available from the fuel cell system; a state-of-charge of an internal rechargeable battery within the fuel cell system; a temperature of the fuel cell stack; a pressure at an inlet of the fuel cell stack; a pressure at an outlet of the fuel cell stack; cell voltages for individual cells in the fuel cell stack; how much fuel remains in the fuel source; certification information for the fuel cell system; and identification information that facilitates identifying an individual fuel cell unit and/or individual fuel cartridges.

Next, portable electronic device 120 receives the fuel cell state information (step 304), and in response generates fuel cell control information based on the received fuel cell state information (step 306). For example, the fuel cell control information can specify one or more of the following: a request for a specified amount of power from the fuel cell system; a reactant rate in the fuel source; a fuel cell stack current to be pulled off the fuel cell stack; a speed of a fan within the fuel stack system; and a command to run diagnostics for the fuel cell system.

The fuel cell control information can also specify power demand predictions. For example, the fuel cell control information can specify that portable computing device 120 expects to require 60 W of power in ten minutes time. In another example, as the battery within the portable electronic device 120 charges up, the fuel cell control information can specify that the demand for power from the fuel cell system 100 is likely to decrease over time. Providing such power demand predictions enables fuel cell system 100 to optimize its performance differently than if such predictions were not available.

Portable electronic device 120 then transmits the fuel cell control information to fuel cell system 100 through the bi-directional communication link (step 308). Finally, fuel cell system 100 receives the fuel cell control information (step 310), and uses the received fuel cell control information to control the fuel cell system (step 312). The above-described processes for controlling the fuel cell system can involve using one or more feedback-control loops to actively control one or more operating parameters of the fuel cell system.

Fuel Cell System Coupled to an External Power Source

Figure 4:
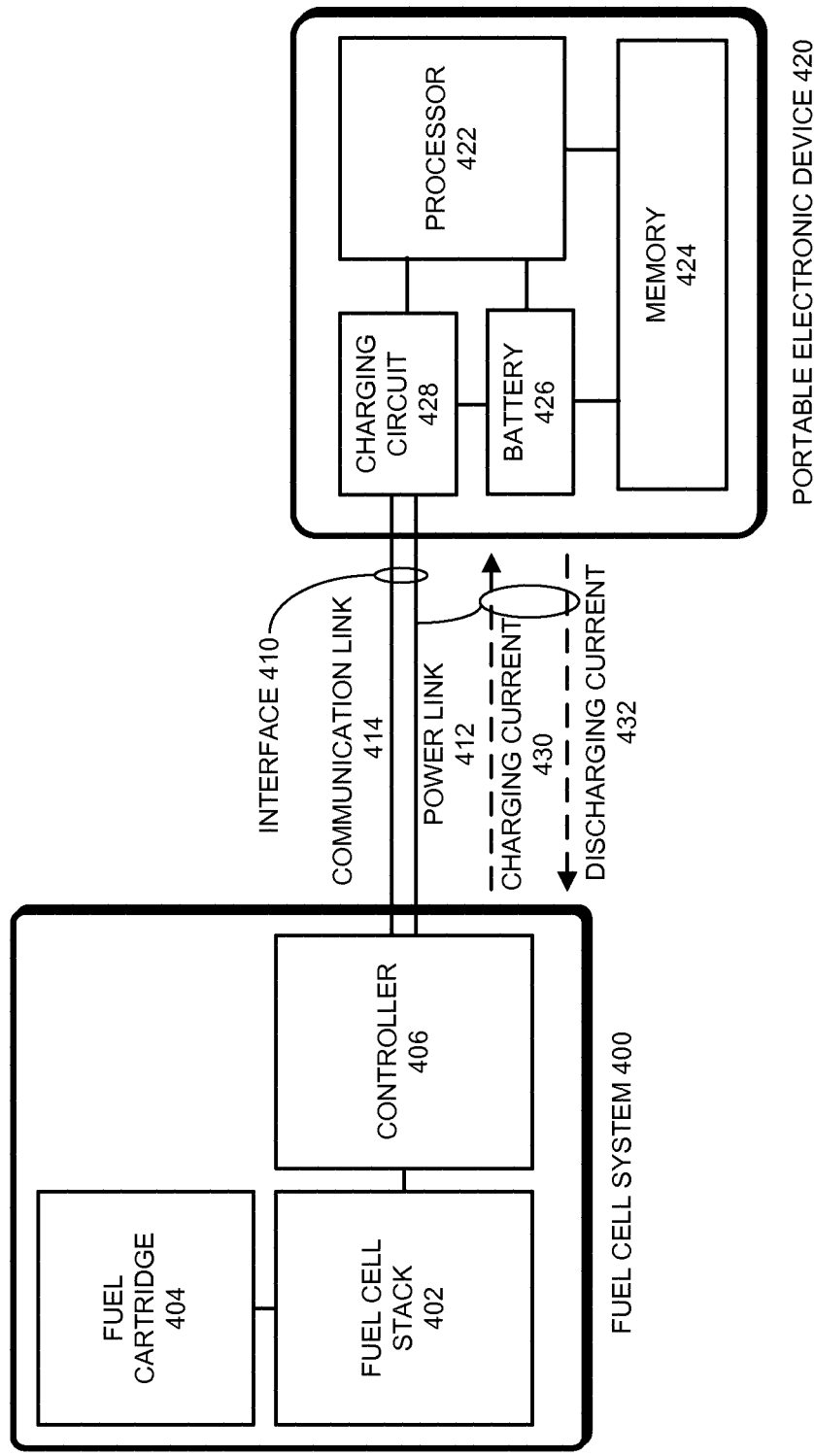
FIG. 4 illustrates a fuel cell system which uses an external battery to store power in accordance with the disclosed embodiments.

FIG. 4 illustrates a fuel cell system 400 which uses an external battery to store operating power in accordance with the disclosed embodiments.

As illustrated in FIG. 4, fuel cell system 400 includes many of the same components as fuel cell system 100 in FIG. 1B, such as a fuel cell stack 402 and a fuel cartridge 404. Note that all the descriptions for fuel cell stack 102 and fuel cartridge 104 above are applicable to fuel cell stack 402 and fuel cartridge 404. Power from fuel cell stack 402 feeds into a controller 406 that performs control functions, such as monitoring and regulating a power state of fuel cell stack 402, monitoring and regulating a hydrogen pressure in fuel cell stack 402, and regulating a current provided by fuel cell stack 402 to an external electronic device. These controller functions are described in more detail below.

FIG. 4 also illustrates how fuel cell system 400 can be coupled to a portable electronic device 420 through an interface 410. Portable electronic device 420 may correspond to a laptop computer, mobile phone, personal digital assistant (PDA), portable media player, digital camera, and/or other type of compact electronic device. For example, portable electronic device 420 may include a processor 422 and a memory 424, which are all powered by a rechargeable battery (or "battery") 426. Portable electronic device 420 also includes a charging circuit 428 coupled to battery 426 which controls both charging and discharging currents of battery 426. In one embodiment, charging circuit 428 is part of a battery management unit (BMU) (not shown) that controls battery 426 on portable electronic device 420.

Note that interface 410 is directly coupled between controller 406 in fuel cell system 400 and charging circuit 428 in portable electronic device 420. Interface 410 includes: (1) a bi-directional power link 412 that transfers electrical power between fuel cell system 400 and portable electronic device 420, and (2) a communication link 414 that provides bi-directional communication between charging circuit 428 in portable electronic device 420 and controller 406 in fuel cell system 400. More specifically, the coupling through communication link 414 allows controller 406 to control charging circuit 428 which, in turn, regulates the charging process on battery 426. On the other hand, the coupling through power link 412 allows a regulated electrical power to be transferred between fuel cell stack 402 and battery 426, wherein the power regulation is performed by controller 406 and charging circuit 428.

In one embodiment, communication link 414 is substantially the same as communication link 114 in FIG. 1B, and hence can perform all the functions associated with communication link 114. Note that power link 412 can be a separate link from power link 112 in FIG. 1B, such that the former is a bi-directional power link for transferring power between fuel cell stack 402 and battery 426, while the latter is a unidirectional power link specifically for transferring power from fuel cell stack 402 to one or more components in portable electronic device 420. In another embodiment, however, power link 412 can perform all the functions associated with power link 112.

In some embodiments, controller 406 provides power to a portable electronic device 420 through a MagSafe™ connector (not shown) which is coupled to the end of interface 410. Note that the connector on interface 410 is not limited to a MagSafe™ connector, and in general can include any type of connector that provides power and bi-directional communication, such as a USB connector or a 30-pin iPod™ connector. In some embodiments, controller 406 can also perform DC-to-DC conversion operations before transferring the power through interface 410 to portable electronic device 420.

Note that interface 410 may provide physical links for both power and communication. However, in an alternative embodiment, interface 410 may provide a single physical connection for the power link and a wireless bi-directional data link. In other embodiments, the power link may also be wireless.

Note that, unlike fuel cell system 100 described above, fuel cell system 400 does not include a rechargeable battery, such as rechargeable battery 108 in fuel cell system 100 (or only includes a small rechargeable battery which is used to power controller 406). In one embodiment, fuel cell system 400 can direct excess power generated by fuel cell stack 402 over power link 412 to be stored externally on rechargeable battery 426 in portable electronic device 420.

In one embodiment, fuel cell stack 402, controller 406, interface 410 (and its bi-directional links), charging circuit 428, and battery 426 form a closed control loop to servo an operational parameter of fuel cell stack 402. In this embodiment, controller 406 may be configured to monitor the operational parameter of the fuel cell stack, and then adjust and maintain the operational parameter around a set-point. More specifically, based on the value of the operational parameter, controller 406 can command charging circuit 428, through communication link 414, to charge battery 426 at a variable rate. Note that, when charging circuit 428 charges battery 426 at a faster/slower rate (i.e., with a larger/smaller charging current), charging circuit 428 draws more/less power from fuel cell stack through power link 412. This effectively servos the operational parameter of fuel cell stack 402.

In one embodiment, this operational parameter is hydrogen pressure inside fuel cell stack 402. As described above, hydrogen is provided to fuel cell stack 402 to generate electrical current. For stable operation of fuel cell stack 402, controller 406 should be configured to maintain hydrogen pressure provided to fuel cell stack 402 at a predetermined set-point. As described above, a hydrogen pressure can be measured as excess hydrogen exits fuel cell stack 402 through an $H_2$ outlet and feeds through a pressure sensor on controller 406. However, the embodiment of FIG. 2A maintains stack outlet pressure at a set-point by charging/discharging an internal battery 108 on fuel cell system 100. Rather other charging/discharging an internal battery (which may not exist on fuel cell system 400) to maintain the hydrogen pressure, one embodiment uses the closed control loop of fuel cell stack 402, controller 406, interface 410, charging circuit 428, and battery 426, to maintain the stack outlet pressure.

More specifically, during normal operation of fuel cell system 400 (assuming hydrogen pressure is maintained around the set-point), charging circuit 428 continuously charges battery 426 with a charging current 430 drawn from fuel cell stack 402. In one embodiment, charging circuit 428 uses an integrated DC-to-DC converter to convert charging current 430 into a battery voltage which is suitable for charging battery 426.

Meanwhile, controller 406 continuously monitors the hydrogen pressure and determines if the hydrogen pressure is above or below the set-point. If the monitored hydrogen pressure goes above the set-point, controller 406 transmits a control signal to charging circuit 428, through communication link 414, to cause battery 426 to charge at a faster rate. While charging battery 426 at the faster rate, charging circuit 428 draws more power (i.e., causing charging current 430 to increase) from fuel cell stack 402, which in turn causes the hydrogen pressure to decrease. In this manner, controller 406 continuously regulates the charging current until the hydrogen pressure returns to the set-point.

Conversely, when the monitored hydrogen pressure moves below the set-point, controller 406 sends a control signal to charging circuit 428 which causes battery 426 to charge at a slower rate. While charging battery 426 at the slower rate, charging circuit 428 draws less power (i.e., causing charging current 430 to decrease) from fuel cell stack 402, which in turn causes the hydrogen pressure to increase. In this manner, controller 406 continuously regulates the charging current until the hydrogen pressure returns to the set-point. When the hydrogen pressure is substantially equal to the set-point, controller 406 can maintain a constant charging current (a constant charging current 430) so that charging circuit 428 draws a substantially constant current from fuel cell stack 402 to maintain the hydrogen pressure.

Note that, because the capacity of a rechargeable battery of an external electronic device (e.g., a laptop) can be sufficiently large, regulating a fuel cell operating parameter by directly charging an external battery with the fuel cell allows the control process to be highly reliable.

In one embodiment, battery 426 in portable electronic device 420 can also be used to provide power to fuel cell system 400 through interface 410. For example, assume battery 426, which is at least partially charged, is coupled to fuel cell system 400 through interface 410 while fuel cell system 400 is off. During a boot-up process for fuel cell system 400, controller 406 causes fuel cartridge 404 to pump hydrogen gas into fuel cell stack 402 to build up the hydrogen pressure. However, before a threshold level hydrogen pressure is reached, no current will be generated by fuel cell stack 402. As the hydrogen pressure continues to rise past the threshold level, controller 406 starts to draw a small current from fuel cell stack 402. As the hydrogen pressure rises toward the set-point value, the current generated by fuel cell stack 402 also increases.

Note that, during this period of building up hydrogen pressure from zero toward the set-point value, fuel cell system 400 may be externally powered by battery 426. More specifically, as battery 426 discharges, a discharging current 432 can be transferred from battery 426 to controller 406 and other components in fuel cell system 400 over bi-directional power link 412 to provide necessary power to the boot-up process. In one embodiment, the discharging process of battery 426 may be activated by controller 406. For example, controller 406 can send a control signal through communication link 414 to charging circuit 428, which subsequently establishes discharging current 432 from battery 426. Charging circuit 428 can also regulate the magnitude of discharging current 432 and route discharging current 432 from battery 426 over power link 412 to power fuel cell system 400. After the hydrogen pressure in fuel cell stack 402 reaches the set-point value, controller 406 may send another control signal to charging circuit 428 to command charging circuit 428 to terminate the discharging of battery 426. Note that this transition point essentially reverses the current flow in power link 412. At this transition point, the above-described closed loop control process can be engaged, and battery 426 begins to receive charging current 430 from fuel cell stack 402 flowing to portable electronic device 420 to servo the operational parameter around the set-point.

Note that, while the above discussion assumes all control functions are generated by controller 406 in fuel cell system 400, other embodiments can generate these control functions from a controller located in portable electronic device 420. However, this embodiment requires that values of the fuel cell stack operational parameter be transmitted over interface 410 to portable electronic device 420.

Controlling a Fuel Cell System Using an External Rechargeable Battery

Figure 5:
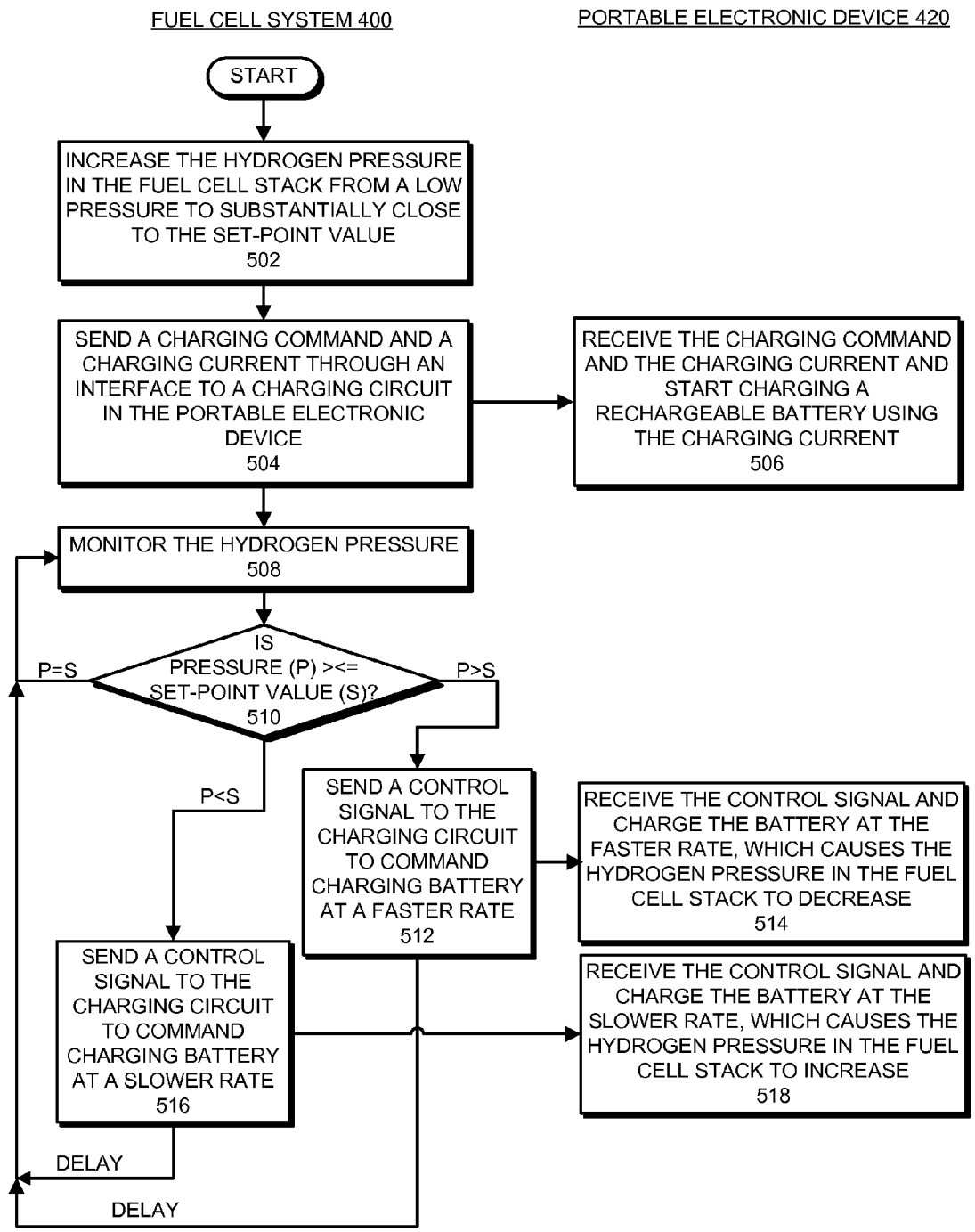
FIG. 5 presents a flow chart illustrating how a fuel cell system can use an external rechargeable battery on a portable electronic device to maintain hydrogen pressure around a set-point in accordance with the disclosed embodiments.

FIG. 5 presents a flow chart illustrating how fuel cell system 400 can use external rechargeable battery 426 on portable electronic device 420 to maintain hydrogen pressure around a set-point in accordance with the disclosed embodiments. The left-hand column of FIG. 5 lists actions performed by fuel cell system 400, and the right-hand column lists actions performed by portable electronic device 420. During operation, fuel cell system 400 starts by increasing the hydrogen pressure in fuel cell stack 402 from a low pressure to substantially close to the set-point value (step 502). Step 502 is described in more detail in conjunction with FIG. 6.

Next, controller 406 in fuel cell system 400 sends a charging command and a charging current through interface 410 to charging circuit 428 in portable electronic device 420, wherein interface 410 comprises: a power link that transfers electrical power between the fuel cell system and the portable electronic device, and a bi-directional communication link that provides bi-directional communication between the portable electronic device and the fuel cell system (step 504). Next, charging circuit 428 receives the charging command and the charging current and, in response, starts charging rechargeable battery 426 using the charging current (step 506).

Meanwhile, controller 406 in fuel cell system 400 monitors the hydrogen pressure (step 508) and determines if the hydrogen pressure is greater than, less than, or substantially equal to the set-point value (step 510).

If the hydrogen pressure is greater than the set-point value, controller 406 sends a control signal to charging circuit 428 to command charging circuit 428 to charge battery 426 at a faster rate (step 512). Next, portable electronic device 420 receives the control signal and, in response, charges battery 426 at the faster rate (step 514). In doing so, charging circuit 428 draws more power (i.e., causing charging current 430 to increase) from fuel cell stack 402, which in turn causes the hydrogen pressure to decrease. After sending the control signal, and typically after a predetermined delay, controller 406 returns to step 508 to continue the monitoring and adjusting operations.

If the hydrogen pressure is less than the set-point value, controller 406 sends a control signal to charging circuit 428 to command charging circuit 428 to charge battery 426 at a slower rate (step 516). Next, portable electronic device 420 receives the control signal and, in response, charges battery 426 at the slower rate (step 518). In doing so, charging circuit 428 draws less power (i.e., causing charging current 430 to decrease) from fuel cell stack 402, which in turn causes the hydrogen pressure to increase. After sending the control signal, and typically after a predetermined delay, controller 406 returns to step 508 to continue the monitoring and adjusting operations.

If, however, the hydrogen pressure is substantially equal to the set-point value, controller 406 returns to step 508 to continue the monitoring and adjusting operations. Note that, because the hydrogen pressure is at the desired value, there is no change to the charging current or to the amount of power transferred from the fuel cell system to the portable electronic device.

Although the above closed loop control process is described in terms of hydrogen pressure, the general technique can be used with other operational parameters associated with fuel cell system 400, and hence is not limited to hydrogen pressure.

Figure 6:
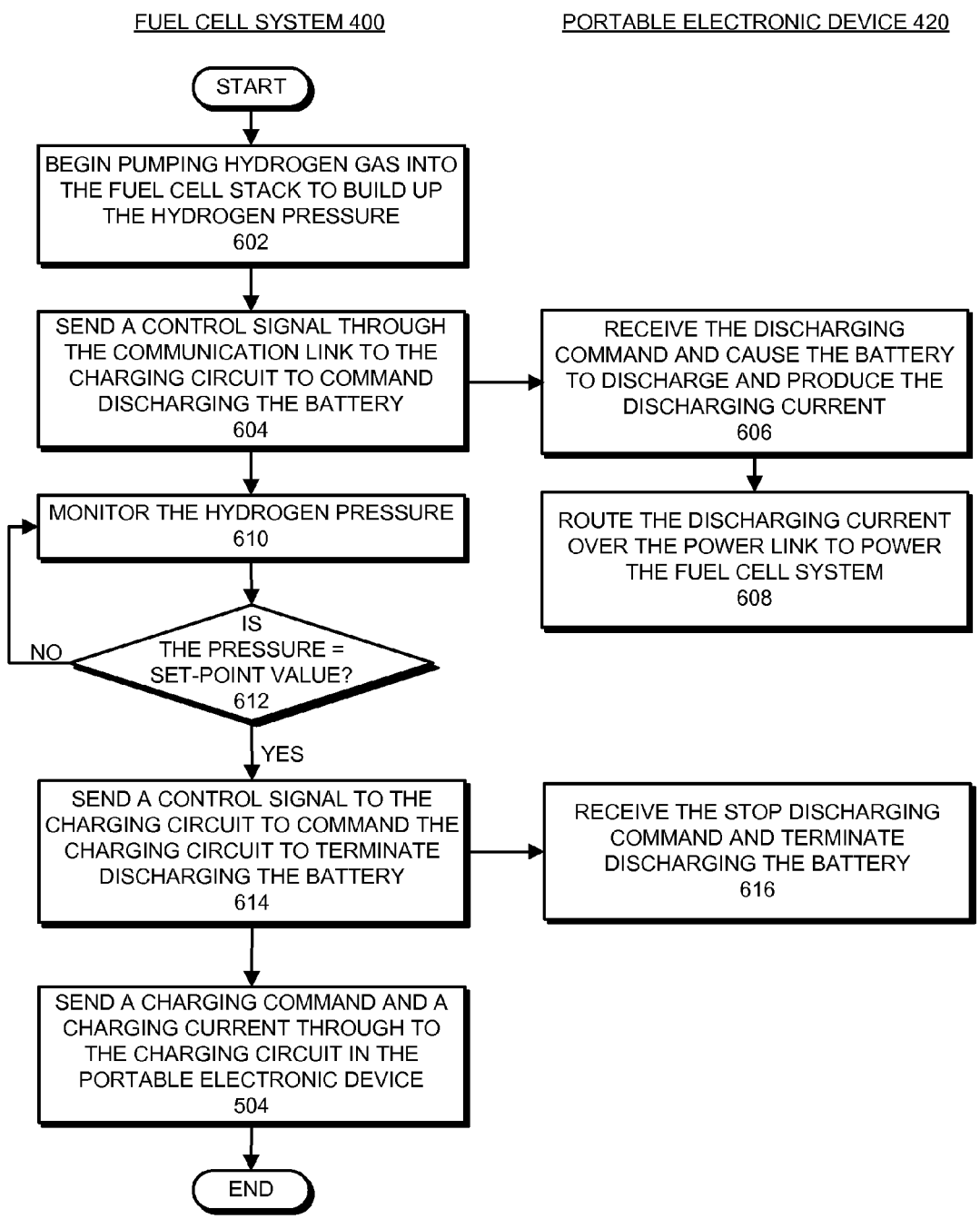
FIG. 6 presents a flow chart illustrating a process of increasing the hydrogen pressure in the fuel cell stack from a low pressure to a pressure substantially close to the set-point value in accordance with the disclosed embodiments.

FIG. 6 presents a flow chart illustrating a process of increasing the hydrogen pressure in fuel cell stack 402 from a low pressure to a pressure substantially close to the set-point value in accordance with the disclosed embodiments.

The left-hand column of FIG. 6 lists actions performed by fuel cell system 400 and the right-hand column lists actions performed by portable electronic device 420. During operation, controller 406 commands fuel cartridge 404 to begin pumping hydrogen gas into fuel cell stack 402 to build up the hydrogen pressure (step 602). Controller 406 then sends a control signal through communication link 414 to charging circuit 428 to command discharging battery 426 (step 604). Next, charging circuit 428 receives the discharging command and, in response, causes battery 426 to discharge and produce discharging current 432 (step 606). Charging circuit 428 then routes discharging current 432 over power link 412 to fuel cell system 400, wherein the power can be used by one or more components in fuel cell system 400 (step 608).

Meanwhile, controller 406 in fuel cell system 400 monitors the hydrogen pressure (step 610) and determines if the hydrogen pressure has reached the set-point value (step 612). If not, controller 406 continues to monitor the hydrogen pressure (step 610), and allowing the hydrogen pressure to rise and the battery 426 to continue discharging current to power fuel cell system 400. However, if controller 406 detects that the hydrogen pressure is substantially equal to the set-point value, controller 406 sends a control signal to charging circuit 428 to command charging circuit 428 to terminate the discharging of battery 426 (step 614).

Next, charging circuit 428 receives the stop discharging command and, in response, terminates discharging battery 426 (step 616). At this point, a significant amount of current is being produced by fuel cell stack 402. Hence, controller 406 can continue to step 504 in FIG. 5 and transition from receiving power from battery 426 to transferring power to battery 426 using the power generated by fuel cell stack 402.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A fuel cell system which is capable of both providing power to and receiving power from a rechargeable battery in a portable computing device, comprising:
   a fuel cell stack in the fuel cell system which converts fuel into electrical power;
   a controller in the fuel cell system which controls operation of the fuel cell system;
   a power link that transfers electrical power between the fuel cell system and the portable computing device; and
   a communication link that provides communication between the portable computing device and the controller for the fuel cell system,
   wherein the controller is programmed to:
      monitor an operational parameter of the fuel cell stack for a predetermined set-point value;
      regulate electrical power provided by the fuel cell system to the rechargeable battery to maintain the operational parameter to the predetermined set-point value; and
      regulate electrical power provided by the rechargeable battery to the fuel cell system by regulating a discharging current provided from the rechargeable battery to the fuel cell stack based on the value of the operational parameter.

2. The fuel cell system of claim 1, wherein the operational parameter is monitored during a boot-up process of the fuel cell system.

3. The fuel cell system of claim 2, wherein while regulating the discharging current based on the value of the operational parameter, the controller is programmed to:
   determine if the value of the operational parameter is less than a set-point value; and
   if so, maintain the discharging current provided by the rechargeable battery to the fuel cell stack;
   otherwise, terminate the discharging current provided by the rechargeable battery to the fuel cell stack.

4. The fuel cell system of claim 1, wherein the fuel cell system does not have an internal rechargeable battery.

5. The fuel cell system of claim 1, wherein while regulating the electrical power provided by the fuel cell system to the rechargeable battery in the portable computing device, the controller is programmed to:
   regulate a charging current provided by the fuel cell stack to the rechargeable battery in the portable computing device based on the value of the operational parameter.

6. The fuel cell system of claim 5, wherein while regulating the charging current based on the value of the operational parameter, the controller is programmed to communicate with a charging circuit in the portable computing device, wherein the charging circuit charges the rechargeable battery based on the charging current.

7. The fuel cell system of claim 6, wherein while regulating the charging current based on the value of the operational parameter, the controller is programmed to:
   determine whether the value of the operational parameter is greater than or smaller than a set-point value;
   regulate the charging current so that the value of the operational parameter decreases when the value of the operational parameter is greater than the set-point value; and
   regulate the charging current so that the value of the operational parameter increases when the value of the operational parameter is smaller than the set-point value.

8. The fuel cell system of claim 7,
   wherein the controller is programmed to continue regulating the charging current until the value of the operational parameter decreases to the set-point value when the value of the operational parameter is greater than the set-point value; and
   wherein the controller is programmed to continue regulating the charging current until the value of the operational parameter increases to the set-point value when the value of the operational parameter is smaller than the set-point value.

9. The fuel cell system of claim 7, wherein if the value of the operational parameter is substantially equal to the set-point value, the controller is programmed to maintain the charging current so that the value of the operational parameter remains the same.

10. The fuel cell system of claim 7,
wherein while regulating the charging current to decrease the value of the operational parameter, the controller is programmed to transmit a first control signal to the charging circuit in the portable computing device, wherein the first control signal causes the charging circuit to increase the charging speed for the rechargeable battery, which subsequently causes the charging current to increase and the value of the operational parameter to decrease; and
wherein while regulating the charging current to increase the value of the operational parameter, the controller is programmed to transmit a second control signal to the charging circuit in the portable computing device, wherein the second control signal causes the charging circuit to decrease the charging speed for the rechargeable battery, which subsequently causes the charging current to decrease and the value of the operational parameter to increase.

11. The fuel cell system of claim 10, wherein the controller is programmed to transmit the first and the second control signals through the communication link.

12. The fuel cell system of claim 5, wherein the controller is programmed to route the charging current through the power link.

13. The fuel cell system of claim 6, wherein the charging circuit converts the charging current into a charging voltage suitable for charging the rechargeable battery.

14. A fuel cell system which is capable of both providing power to and receiving power from a rechargeable battery in a portable computing device, comprising:
a fuel cell stack in the fuel cell system which converts fuel into electrical power;
a controller in the fuel cell system which controls operation of the fuel cell system;
a power link that transfers electrical power between the fuel cell system and the portable computing device; and
a communication link that provides communication between the portable computing device and the controller for the fuel cell system,
wherein the controller is programmed to:
monitor an operational parameter of the fuel cell stack for a predetermined set-point value;
regulate electrical power provided by the fuel cell system to the rechargeable battery in the portable computing device to maintain the value of the operational parameter to the predetermined set-point value; and
regulate a discharging current provided from the rechargeable battery to the fuel cell stack based on the value of the operational parameter.

15. The fuel cell system of claim 14, wherein the portable fuel cell system receives power from the rechargeable battery in the portable computing device to operate the portable fuel cell system, wherein the power is received through the power link.

16. The fuel cell system of claim 14, wherein
the operational parameter is monitored during a boot-up process of the fuel cell system.

17. The fuel cell system of claim 14, wherein while regulating the discharging current based on the value of the operational parameter, the controller is programmed to:
determine if the value of the operational parameter is less than a set-point value; and
maintain the discharging current provided by the rechargeable battery to the fuel cell stack responsive to determining that the value of the operational parameter is less than the set-point value.

18. The fuel cell system of claim 17, wherein the controller is programmed to terminate the discharging current provided by the rechargeable battery to the fuel cell stack responsive to determining that the value of the operational parameter is greater than the set-point value.

19. The fuel cell system of claim 14, wherein the controller is programmed to regulate a charging current provided by the fuel cell stack to the rechargeable battery in the portable computing device based on the value of the operational parameter.

20. The fuel cell system of claim 19, wherein while regulating the charging current based on the value of the operational parameter, the controller is programmed to communicate with a charging circuit in the portable computing device, wherein the charging circuit charges the rechargeable battery based on the charging current.

* * * * *